United States Patent [19]

Fu

[11] Patent Number: 6,056,815

[45] Date of Patent: May 2, 2000

[54] METHODS AND COMPOSITIONS RELATED TO PEARLESCENT PIGMENTS

[75] Inventor: Guoyi Fu, Richmond Hill, Ga.

[73] Assignee: EM Industries, Inc., Hawthorne, N.Y.

[21] Appl. No.: 09/263,061

[22] Filed: Mar. 8, 1999

[51] Int. Cl.[7] .................................................. C09C 1/36
[52] U.S. Cl. ........................ 106/417; 106/415; 106/416; 106/436; 106/437; 427/380; 427/419.2; 427/419.3; 428/403; 428/404
[58] Field of Search .................................. 106/415, 417, 106/436, 437, 416; 428/403, 404; 427/419.2, 419.3, 380

[56] References Cited

U.S. PATENT DOCUMENTS

| | | | |
|---|---|---|---|
| 2,113,946 | 4/1938 | Plechner et al. | 423/612 |
| 2,214,132 | 9/1940 | Hager | 106/436 |
| 2,273,431 | 2/1942 | Booge | 106/436 |
| 2,286,882 | 6/1942 | Von Bichowsky et al. | 423/610 |
| 2,304,110 | 12/1942 | McKinney et al. | 423/611 |
| 2,326,156 | 8/1943 | McCord | 106/436 |
| 2,406,465 | 8/1946 | Keats | 423/612 |
| 3,087,828 | 4/1963 | Linton | 106/412 |
| 3,418,146 | 12/1968 | Rieger et al. | 106/440 |
| 3,437,515 | 4/1969 | Quinn et al. | 427/164 |
| 3,711,308 | 1/1973 | Brand et al. | 106/417 |
| 3,861,946 | 1/1975 | Waitkins et al. | 420/404 |
| 4,038,099 | 7/1977 | DeLuca, Jr. et al. | 106/417 |
| 4,086,100 | 4/1978 | Esselborn et al. | 106/417 |
| 4,128,435 | 12/1978 | Baumer et al. | 106/417 |
| 4,552,593 | 11/1985 | Ostertag | 106/417 |
| 4,623,396 | 11/1986 | Kimura et al. | 106/417 |
| 4,948,631 | 8/1990 | Ostertag et al. | 427/208 |
| 5,091,012 | 2/1992 | Nakamura | 106/440 |
| 5,271,771 | 12/1993 | Franz et al. | 106/474 |
| 5,433,779 | 7/1995 | DeLuca, Jr. | 106/418 |
| 5,540,769 | 7/1996 | Franz et al. | 106/415 |
| 5,565,024 | 10/1996 | Schraml-Marth | 106/415 |
| 5,565,025 | 10/1996 | Schraml-Marth | 106/417 |
| 5,573,584 | 11/1996 | Ostertag et al. | 106/417 |
| 5,626,661 | 5/1997 | Schmid et al. | 106/415 |

*Primary Examiner*—Anthony Green
*Attorney, Agent, or Firm*—Millen, White, Zelano & Branigan, P.C.

[57] ABSTRACT

Disclosed herein is a method of producing pearlescent pigments comprised of a platelet substrate and a $TiO_2$ coating, which has a rutile structure and which does not contain foreign metal species. The method entails the deposition of Ti(III), followed by the deposition of a Ti(IV), onto the platelet substrate.

20 Claims, 1 Drawing Sheet

6,056,815

METHODS AND COMPOSITIONS RELATED TO PEARLESCENT PIGMENTS

BACKGROUND OF THE INVENTION

The invention relates to the field of pearlescent pigments. Pearlescent pigments, which simulate the effect of natural pearl, comprise platelet substrates, such as mica, coated with single or multiple layers of metal oxides or mixed metal oxides with high refractive indexes. The optical nature of these pigments is that each interface between two layered media with different refractive indexes allows partial reflection and partial transmission of incident white light. The light beams reflected (or transmitted) at the interfaces recombine constructively or destructively, depending on the phase relationship of these reflected beams, and result in intensity enhancement only for certain wavelengths. As a result, color is observed corresponding to these enhanced wavelengths at the specular angle. Depending on the optical thickness (physical thickness×refractive index) of the metal oxide(s) layer, beams in different range or ranges of wavelengths in the visible region undergo constructive interference and are observed as different colors. The higher the refractive index of the coating material, the higher the beam intensity reflected at the interfaces and the greater the luster and color effect observed.

The most widely used coating material on platelet substrates is titanium dioxide because of its high refractive index. The most widely used substrate is mica flakes having a high aspect ratio prepared by a wet grinding process. Generally, the titanium dioxide coating is accomplished by controlled hydrolysis of a titanium salt, commonly titanium oxychloride solution, and simultaneous deposition of the hydrous $TiO_2$ particles formed by the hydrolysis onto substrate flakes which are suspended in the hydrolysis system. After calcination, the hydrous $TiO_2$ layer transforms into highly reflecting $TiO_2$, either in anatase or rutile phase. (See e.g. U.S. Pat. Nos. 3,087,828, 3,418,146, and 3,437,515).

A $TiO_2$ layer with a rutile phase structure is generally preferred because of its higher refractive index, which results in stronger luster and color effects, and its higher stability in outdoor weathering. However, the surfaces of many substrates, including mica surfaces, favor the crystallization of the anatase phase structure. Direct deposit of hydrous $TiO_2$ onto these flakes generally results in an anatase coating even though the product is calcined at temperatures as high as 900° C. In order to produce rutile $TiO_2$ coating layers, it is necessary to precoat the surface of the mica with a thin layer of hydrous $SnO_2$ as a rutile initiator (See e.g. U.S. Pat. Nos. 4,038,099 and 4,086,100). A precoating of hydrous $Fe_2O_3$ together with a small amount of Zn, Ca and/or Mg species has also been demonstrated to promote the rutile structure (See U.S. Pat. No. 5,433,779).

Although both $SnO_2$ and $Fe_2O_3$ can be used to produce highly lustrous interference pigments, there are disadvantages that limit the use of such pigments. Added $SnO_2$ is not permitted in plastics for food contact applications or in cosmetic products in some countries. Additionally, $Fe_2O_3$ has an inherent yellowish color, even in very small amounts, which can cause discoloration of certain products, especially white products. Consequently, other rutile promoting materials devoid of these limitations are highly desirable in order to achieve better product quality and broader applications.

U.S. Pat. No. 4,623,396 describes a process of coating mica particles with a first coating of a titanium compound and a second coating of titanium dioxide on the first coating. The titanium deposited in the first coating is a low oxide of titanium and/or a titanium oxynitride. However, the X-ray diffraction pattern of the first coating shows that the titanium dioxide in the first coating has the anatase structure.

SUMMARY OF THE INVENTION

In accordance with the current invention, it has been discovered that pearlescent pigment products containing platelet substrates and rutile $TiO_2$ coating layers substantially free from any foreign metal species can be produced by first depositing a thin layer of Ti(III) precipitate as rutile structure initiator and then depositing a layer of Ti(IV) precipitate with the desired thickness. Without wishing to be limited by any particular mechanism of structure formation, the inventors believe that a thin layer of hydrous Ti(III) oxide forms (probably together with the immediately adjacent part of the hydrous Ti(IV) dioxide layer) a type of short range ordering which facilitates the formation of short range ordering of the hydrous Ti(IV) dioxide layer that leads to the rutile structure. The lower charge of Ti(III) compared to Ti(IV), with the Ti(III) therefore requiring fewer $O^{2-}$ and $OH^{31}$ anions to balance the charge, may be accountable for the initiation of the more compact rutile structure. The Ti(III) species is transformed into Ti(IV) species at later production stages, thereby making the initiator Ti layer indistinguishable from the secondary $TiO_2$ layer. During the product finishing processes, i.e., drying, calcination, etc., both the Ti(III) layer and the following Ti(IV) layer transform into rutile $TiO_2$, resulting in a highly reflective, pure rutile coating.

In general, the method of the invention comprises the following steps: (1) precipitating a Ti(III) salt onto platelet substrates to form a primary coated substrate coated with a Ti initiating layer; (2) precipitating a Ti(IV) salt onto the Ti initiating layer to form a secondary coated substrate, coated with a Ti initiating layer and a superposed Ti coating layer; (3) heat treating the secondary coated substrate for a sufficient time and at a sufficient temperature to convert the Ti in both the Ti initiating layer and the Ti coating layer to $TiO_2$ having a rutile structure.

Coating of the platelet substrate with the Ti initiating layer is accomplished by precipitating a Ti(III) salt solution in the presence of a constantly agitated platelet suspension. Platelet substrates include, but are not limited to, the following materials: natural or synthetic mica such as muscovite, phlogopite, and biotite; other sheet silicates, such as talc, kaolin or sericite; glass platelets, silica flakes and alumina flakes. Mica particles are preferred, and wet-ground muscovite is most preferred. Mica particle sizes, as measured by light scattering methods, are preferably in the range of 5–400 microns ($\mu$m), more preferably in the range of 5–100 $\mu$m, and most preferably in the range of 5–50 $\mu$m.

Sufficient Ti(III) should preferably be employed such that the hydrous oxide precipitates to completely cover the substrate surfaces. For example, for a mica fraction with a particle size range 10–50 $\mu$m (based on light scattering measurements) the amount of Ti(III) needed to ensure a complete rutile phase is ~1.5 wt. % Ti of the amount of mica used, which is equivalent to ~2.5 wt. % $TiO_2$ vs. mica in the final product. For substrates with different particle size ranges and therefore different surface areas, the amount of Ti(III) used should be adjusted accordingly. Smaller substrate particles need more Ti(III) on a weight basis and vice versa. Preferably, the coating of Ti(III) will produce an initiating layer of about 3–4 nanometers (nm) in the final product. An insufficient amount of Ti(III) may result in incomplete coverage and thereby result in a mixture of rutile and anatase phases. Excessively thick coating layers are not preferred because Ti(III) precursor compounds are significantly more expensive than Ti(IV) compounds and the Ti(III) compounds are also sensitive and difficult to handle. Additionally, excessively thick coating layers will involve a larger scale oxidation reaction and may result in damage to the entire coating. The initiating layer before calcination will be slightly thicker than the layer after calcination due to hydration.

Suitable Ti(III) salt solutions include, but are not limited to $TiCl_3$, $Ti_2(SO_4)_3$, and $TiBr_3$. A preferred Ti(III) salt solution is $TiCl_3$. Precipitation is preferably accomplished by the addition of a base to the suspension, such as for example NaOH or $Na_2B_4O_7·10H_2O$, under constant pH and temperature. The pH is generally maintained in the range of from about 2.0 to about 3.0 for Ti(III) precipitation, more preferably from about 2.4 to about 2.8, and most preferably at about 2.5. A coating pH significantly lower than 2.0 results in a coating with an anatase structure, or at best, a coating which is a mixture of anatase and rutile structure. Without wishing to be bound by any explanation, a possible reason for the pH sensitivity is that Ti(III) becomes a stronger reducing agent at lower pH values, resulting in the oxidation of Ti(III) ions to Ti(IV) ions by water during the precipitation process. A coating pH significantly higher than 3.0 is likely to cause agglomeration and reduce product quality.

Because Ti(III) is sensitive towards oxidation, the coating should be performed under an inert atmosphere. For example, the coating may be performed under an inert gas, such as, for example, nitrogen, argon or helium. Nitrogen is preferred. Alternatively, oxidation may be prevented by the frequent addition to the reactor of a reducing agent that is stronger than Ti(III), such as, for example, $NaBH_4$. The reducing agent will consume oxygen and prevent Ti(III) from becoming oxidized. However, a large amount of reducing agent must be employed for this method to be effective, thereby increasing the cost and difficulty of the process.

Coating under an inert atmosphere can be accomplished by bubbling $N_2$ through the coating suspension at a flow rate sufficient to prevent $O_2$ from entering the coating system. For a two-liter coating suspension, a $N_2$ flow rate of 10–15 standard cubic feet per hour (SCFH) is more than enough. The beginning stage of Ti(IV) deposition should also be done under an inert atmosphere until a thin layer of Ti(IV) precipitate, e.g. at least about 5 nm, has covered the Ti(III) layer. An initial Ti(IV) layer that is too thin may result in insufficient rutilization and hence a mixture of phases. After the deposition of a thin layer of Ti(IV), the inert atmosphere protection may be removed and further coating may be continued under a normal atmosphere. Alternatively, the entire coating process may be conducted under $N_2$ protection. Experimentally it is observed that after removal of the $N_2$ protection, the purple-blue color characteristic of Ti(III) ions disappears gradually, indicating the oxidation of Ti(III) species into Ti(IV) species. However, the transformation of Ti(III) to Ti(IV) at this stage does not affect the formation of the rutile structure in the final product because the short range ordering required to form a rutile structure has already formed.

A Ti coating layer is added by precipitating a Ti(IV) salt onto the Ti initiating layer to form a secondary coated substrate. Suitable Ti(IV) salt solutions include, but are not limited to $TiCl_4$, $Ti(SO_4)_2$, $TiBr_4$, and $TiF_4$. A preferred Ti(IV) salt solution is $TiCl_4$. Sufficient Ti(IV) should preferably be employed such that the hydrous oxide precipitates to form a coated particle with a $TiO_2$ layer completely covering the substrate surface. Precipitation is preferably accomplished by the addition of a base to the suspension, such as for example NaOH or $Na_2B_4O_7·10H_2O$, under constant pH and temperature. The pH is generally maintained in the range of from about 1.6 to about 2.6 for Ti(IV) precipitation, more preferably from about 2.0 to about 2.4, and most preferably at about 2.2. The temperature is generally maintained at a range of between about 70° C. to about 90° C., and preferably between about 75° C. to about 80° C. If the pH or temperature is too low, incomplete hydrolysis may occur, resulting in excessive water in the coating and a reduced quality of the coating. If the pH or temperature is too high, hydrolysis may proceed to rapidly and result in the precipitation of large particles on the surface of substrate, thereby reducing the quality of the coating. A pH or temperature that is too high may also result in the agglomeration of the substrate particles.

The $TiO_2$ layer, including both the coating layer and the initiating layer, is preferably from about 50 nm to about 300 nm. The thickness is determined by the preferred color of the product. The color develops from white (about 50 nm) to yellow, to red, to blue and finally to green (about 300 nm).

After the platelet substrate has been coated with both Ti(III) and Ti(IV) further processing of the coated substrate generally includes raising the pH of the suspension to about 5, filtering and washing the coated substrate with deionized water several times, drying the coated substrate, and calcining the coated substrate. For example, the coated substrate may be processed as follows: dried at 110° and calcined at a higher temperature, such as for example, from 500° C. to 900° C. The coated substrate is preferably dried at a temperature of from about 80° C. to about 150° C., and more preferably at about 110° C. Drying at a temperature significantly below 80° C. will not effectively dry the product and drying at a temperature significantly above 150° C. is equivalent to doing a calcination without drying, which may damage the coating. Calcining of the coated substrate is preferably carried out at a temperature of about 500° C. to about 900° C., more preferably from about 700° C. to about 850° C., and most preferably at about 800° C. Calcining at too low of a temperature results in incomplete crystallization and calcining at too high of a temperature may damage the coating by generating cracks. In both instances, the luster and color strength of the product will be reduced.

A promising area of application for products of this invention is in areas such as cosmetics, food stuffs, and food contact applications, where the tin-free coatings are preferred to meet government health and safety regulations.

Figure 1:
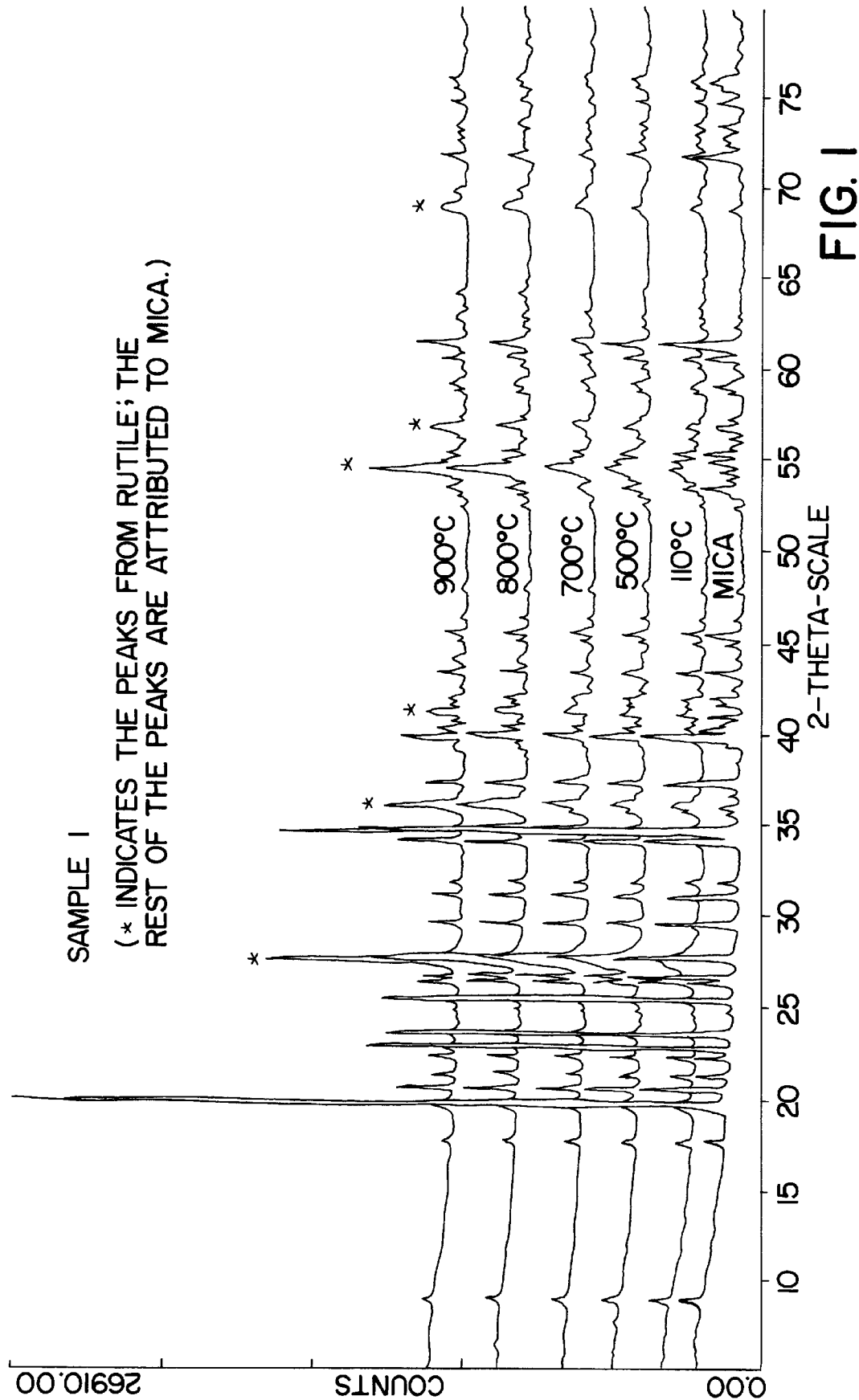
FIG. 1 is an X-ray powder diffraction analysis of products of the instant invention prepared according to Example 1 below. The analysis was accomplished using a Siemens D5000 X-ray Powder Diffractometer equipped with a rotating sample holder and a Cu anode ($\lambda=1.5406$ Å). The results demonstrate the development of the rutile crystallization structure (indicated with asterisks) with temperature, at temperatures ranging from 110° C. to 900° C. The $TiO_2$ coating was completely in the rutile form and the rutile crystallization starts at a temperature as low as 110° C. (dried product). For fully calcined products (calcined at 700° C. or higher), all Ti compounds should be in crystalline forms, either rutile or anaphase. No anatase $TiO_2$ peaks are observed throughout the entire temperature range.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

In the following examples, all parts and percentages are by weight unless otherwise indicated.

Example 1

The coating experiment was performed on 100 g mica (10–50 μm) in a slurry (~50 g/l) in a 5 L standard reactor with a 2.7"agitator. The Ti(III) coating was done at constant temperature of 75 ° C., with agitation (rotating at ~800 RPM), and with two $N_2$ gas inlets bubbling through the suspension at a total flow rate of ~20 SCFH. After the pH of the slurry was reduced to ~2.5 with dilute HCl solution, 24 g $TiCl_3$ solution (20% in 3% HCl) was delivered into the system at an inflow rate of ~0.5 ml/min, with the pH controlled at 2.5 by the simultaneous delivery of a 3% NaOH solution. Immediately after Ti(III) precipitation, $TiCl_4$ (400 g/l) was delivered to the system at an inflow rate of ~0.5 ml/min, reducing the pH to 2.2 and then with the pH controlled at 2.2 by the delivery of a 20% NaOH solution. The coating was continued by the delivery of $TiCl_4$ at the same rate for ~1 hour and then at the rate of ~1.0 ml/min for 0.5 hour. $N_2$ inflow was then stopped, the temperature was increased to 80° C, and $TiCl_4$ inflow was increased to a rate of 1.5 ml/min. These conditions were maintained until the silver white endpoint was reached. After coating, the suspension was agitated for about 30 minutes, and then the pH was raised to 5.0 with a NaOH solution. The suspension was agitated for another 30 minutes, and the product was filtered and washed several times with deionized water. The product was then dried at 110° C. and calcined at 800° C. for 30 minutes. The product was screened prior to the conduction of physical measurements.

Example 2

Example 2 was carried out according to the process of Example 1, with the exception that mica (5–15 micrometer) was used as the substrate. Accordingly, the amount of $TiCl_3$ employed was 36 g rather than 24 g.

Example 3

Example 3 was carried out according to the process of Example 1, with the exception that solid $Na_2B_4O_7 \cdot 10H_2O$ was used to precipitate $TiCl_3$. The solid $Na_2B_4O_7$ was added to the coating system in very small portions at pH 2.5. After each addition, the pH went up to ~3.0 and slowly decreased to 2.5 again with continued addition of the $TiCl_3$ solution. The $TiCl_4$ precipitation was done with 20% NaOH solution as in Example 1. The coating was performed until a blue endpoint was reached.

Examples 4–6

Samples were prepared as control samples (Controls 1–3 in Table I below) of the samples prepared in Examples 1–3 above. They were prepared under the same conditions as specified for Examples 1–3 above, respectively, except that $SnCl_4$ was used as the rutile promoting agent instead of $TiCl_3$. Accordingly, no $N_2$ protection was used and the coating was conducted at a pH of 1.8 for $SnCl_4$ and at a pH of 2.2 for $TiCl_4$.

X-ray powder diffraction analysis was carried out on a number of products, prepared according to Example 1 above, using a Siemens D5000 X-ray Powder Diffractometer equipped with a rotating sample holder and a Cu anode ($\lambda$=1.5406 Å) (FIG. 1). The results demonstrate the development of the rutile crystallization structure (indicated with asterisks) with temperature, at temperatures ranging from 110° C. to 900° C. The $TiO_2$ coating was completely in the rutile form and rutile crystallization starts at a temperature as low as 110° C. (dried product). No anatase $TiO_2$ peaks are observed throughout the entire temperature range.

Table I below presents a comparison of the colorimetric data of three lab products made by the Ti(III) coating process of this invention (Examples 1–3) and three lab products made using precipitation of Sn(IV) as an initiator of rutile structure formation (Controls 1–3) (See Examples 4–6 above). The L (lightness) and a & b (color) values were measured on standard drawdowns on drawdown cards with white and black backgrounds, using a Hunterlab Model D25M Optical Sensor with a modified tilting sample holder. The tilting sample holder allows measurements at variable illumination angles.

TABLE I

| | L, a, b values (Absolute) | | | | | | | | |
|---|---|---|---|---|---|---|---|---|---|
| | 45° Over Blank | | | 22.5° Over Black | | | 45° White | | |
| Product | L | a | b | L | a | b | L | a | b |
| Control 1 | 43.76 | −0.63 | −4.84 | 94.29 | −4.38 | −1.67 | 70.48 | 0.47 | 5.75 |
| Example 1 | 41.90 | −0.74 | −5.57 | 95.64 | −4.99 | −1.78 | 69.24 | 0.28 | 6.33 |
| Control 2 | 50.35 | −0.48 | −4.46 | 88.74 | −2.23 | −3.60 | 75.20 | −0.11 | 5.94 |
| Example 2 | 50.38 | −0.37 | −3.36 | 93.12 | −1.70 | −2.49 | 72.83 | −0.68 | 5.68 |
| Control 3 | 30.27 | −0.46 | −19.47 | 53.19 | −1.90 | −40.29 | 85.31 | −0.05 | 16.25 |
| Example 3 | 30.14 | 0.68 | −18.22 | 55.06 | 0.14 | −44.62 | 84.79 | −0.46 | 18.40 |

Table I: Example products 1–3 were made according to procedures described above in Examples 1–3, respectively. Control products 1–3 were made according to procedures described above in Examples 4–6, respectively.
L = lightness;
a & b = color.

The X-ray diffraction and calorimetric data, other test results by Scanning Electron Microscopy, surface area and porosity measurements, and visual examinations on drawdown cards, demonstrate that the use of Ti(III) as rutile phase initiator works equally as well as Sn(IV) as a rutile phase initiator. The products are comparable to the corresponding Sn-containing products in terms of luster, opacity and color strength, but nevertheless achieve a significant advance in the field by virtue of the lack of Sn.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all patent applications, patents, and publications cited herein are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for producing platelet substrates with a $TiO_2$ coating having a rutile structure, comprising the steps of:
   (1) precipitating at least one hydrolyzed Ti(III) salt onto at least one platelet substrate to form a primary coated substrate coated with a Ti initiating layer;
   (2) precipitating at least one hydrolyzed Ti(IV) salt onto the Ti initiating layer to form a secondary coated substrate, coated with a Ti initiating layer and a Ti coating layer;
   (3) heat treating the secondary coated substrate for a sufficient time and at a sufficient temperature to convert the Ti in both the Ti initiating layer and the Ti coating layer to $TiO_2$ having a rutile structure.

2. A method according to claim 1, wherein at least one platelet substrate comprises mica particles with an average size of between 5 and 400 microns.

3. A method according to claim 1, wherein step (1) of precipitating at least one Ti(III) salt onto at least one platelet substrate is accomplished under an inert atmosphere.

4. A method according to claim 1, wherein the Ti initiating layer has a thickness of at least 3 nm.

5. A method according to claim 1, further comprising the steps of
   (4) drying the secondary coated substrate; and
   (5) calcining the secondary coated substrate.

6. A method according to claim 1,
   wherein at least one platelet substrate comprises mica particles with an average size of between 5 and 400 microns;
   wherein step (1) of precipitating at least one Ti(III) salt onto at least one platelet substrate is accomplished under an inert atmosphere; and
   wherein the Ti initiating layer has a thickness of at least 3 nm.

7. A method according to claim 2, wherein step (1) of precipitating at least one Ti(III) salt onto at least one platelet substrate is accomplished under an inert atmosphere.

8. A method according to claim 2, wherein the Ti initiating layer has a thickness of at least 3 nm.

9. A method according to claim 2, further comprising the steps of
   (4) drying the secondary coated substrate; and
   (5) calcining the secondary coated substrate.

10. A method according to claim 9,
    wherein step (1) of precipitating at least on ti(III) salt onto at least on platelet substrate is accomplished under an inert atmosphere; and
    wherein the Ti initiating layer has a thickness of a least 3 nm.

11. A pigment product comprising a coated platelet substrate having a $TiO_2$ coating, wherein the $TiO_2$ coating has a rutile structure, and wherein the coated platelet substrate is formed by a process comprising the steps of:
    (1) precipitating at least on Ti(III) salt onto at least one platelet substrate to form primary coated substrate coated with a Ti initiating layer;
    (2) precipitating at least on Ti(IV) salt onto the Ti initiating layer to form secondary coated substrate, coated with a Ti initiating layer and a Ti coating layer;
    (3) heat treating the secondary coated substrate for a sufficient time and at a sufficient temperature to convert the Ti in both the Ti initiating layer and the Ti coating layer to $TiO_2$ having a rutile structure.

12. A pigment product according to claim 11, wherein at least one platelet substrate comprises mica particles with an average size of between 5 and 400 microns.

13. A pigment product according to claim 11, wherein step (1) of precipitating at least on Ti(III) salt onto at least one platelet substrate is accomplished under inert atmosphere.

14. A pigment product according to claim 11, wherein the Ti initiating layer has a thickness of a least 3 nm.

15. A pigment product according to claim 11, formed by a process further comprising the step of
    (4) drying the secondary coated substrate; and
    (5) calcining the secondary coated substrate.

16. A pigment product according to claim 11,
    wherein at least one platelet substrate comprises mica particles with an average size of between 5 and 400 microns;
    wherein step (1) of precipitating at least on Ti(III) salt onto at least one platelet substrate is accomplished under inert atmosphere; and
    wherein the Ti initiating layer has a thickness of at least 3 nm.

17. A pigment product according to claim 12, wherein step (1) of precipitating at least one Ti(III) salt onto at least one platelet substrate is accomplished under inert atmosphere.

18. A pigment product according to claim 12, wherein the Ti initiating layer has a thickness of a least 3 nm.

19. A pigment product according to claim 12, formed by a process further comprising the steps of
    (4) drying the secondary coated substrate; and
    (5) calcining the secondary coated substrate.

20. A pigment product according to claim 19,
    wherein step (1) of precipitating at least on Ti(III) salt onto at least one platelet substrate is accomplished under inert atmosphere; and
    wherein the Ti initiating layer has a thickness of at least 3 nm.

* * * * *